P. Davis.
Buggy Boat.
No. 30,618. Patented Nov. 13, 1860.
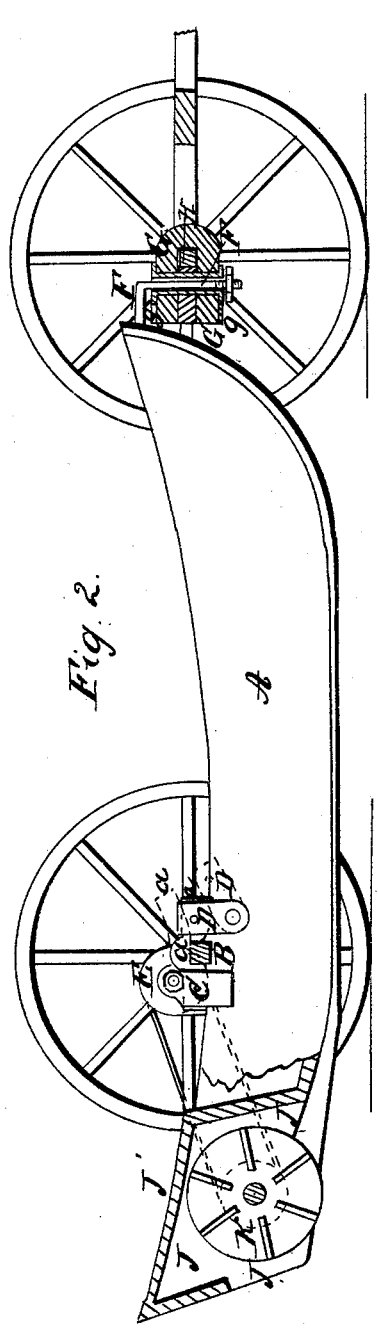
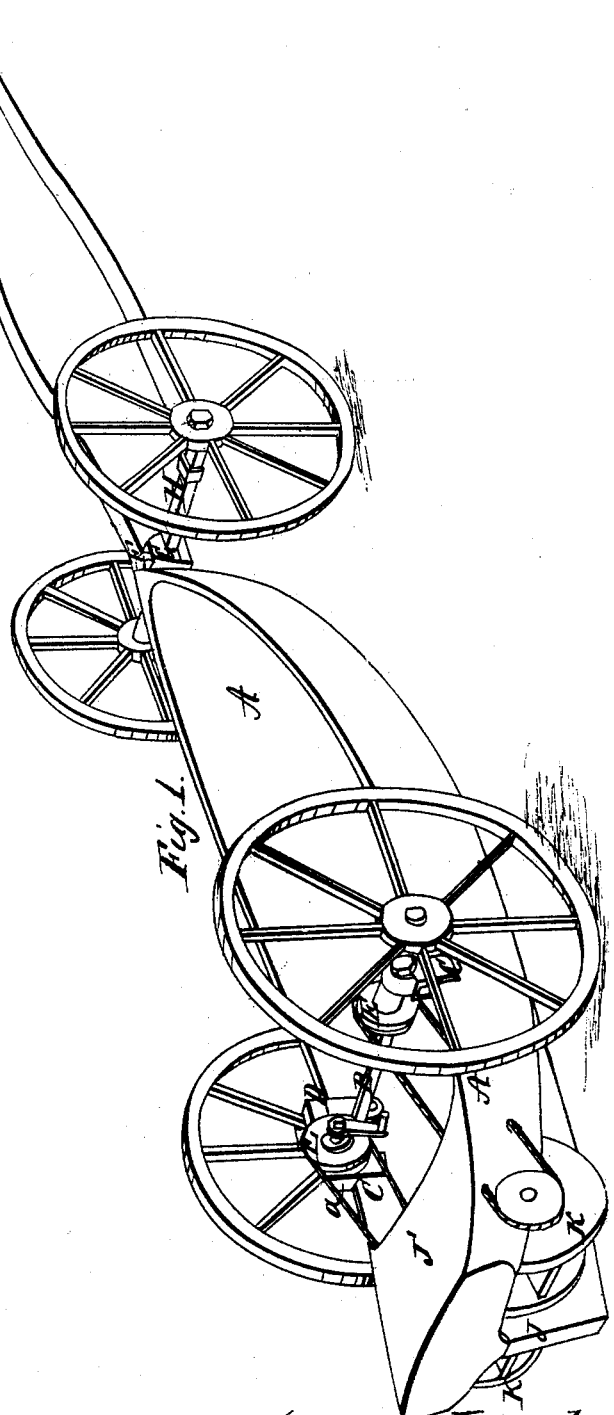
Witnesses
Inventor
Perry Davis

UNITED STATES PATENT OFFICE.

PERRY DAVIS, OF PROVIDENCE, RHODE ISLAND.

BOAT CONVERTIBLE INTO A LAND-CARRIAGE.

Specification of Letters Patent No. 30,618, dated November 13, 1860.

*To all whom it may concern:*

Be it known that I, PERRY DAVIS, of Providence, in the county of Providence and State of Rhode Island, have invented certain new and useful Improvements in Buggy-Boats; and I do hereby declare that the following is a full, clear, and exact description thereof, reference being had to the accompanying drawings, making part of this specification, in which—

Figure 1 is a perspective view of the boat mounted on wheels. Fig. 2 is a longitudinal vertical section taken through the boat and axles.

Similar letters of reference indicate corresponding parts in both figures.

To enable those skilled in the art to fully understand my invention I will proceed to describe its construction and operation.

The boat A, is mounted on four wheels when it is used on land, two hind wheels and two front wheels, the hind wheels are on the ends of a square shaft B, that extends across the top of the boat, from which the boat is hung by rubber springs *a, a*. These springs *a, a*, are simply thick strips of rubber confined at one end by clamps C, C, which are secured to the sides of the boat A by lateral bolts and which serve also to carry the grooved pulley wheels E, E. These clamps press upon and hold the blocks *a*, of rubber down tightly to the edge of the boat. The other ends of the rubber blocks *a*, are secured in a similar manner by clamps D, D, which are pivoted to the boat instead of being fixed like clamps C C so that one end of the rubber blocks may be loosened by slipping off the clamps D D, as shown in red lines Fig. 2, so that the shaft B, of the rear wheels may be put under the rubber blocks and secured by slipping the pivoted clamps D D, back over the ends of the blocks *a*, as represented in Fig. 1. This attachment of the axle B to the boat can be made with very little labor and the small rubber blocks which form the attachment, and by which the boat is hung from the axle B, have been found to answer a better purpose than metal springs as the rubber block springs possess compactness combined with strength and elasticity. They are light and more durable than metal springs which would be impaired by rust, while the rubber would not. The axle B being square it is not liable to turn under the rubber blocks *a a*.

The vertical stationary clamps C C which are behind the axle B, have holes formed transversely through their upper ends, which holes receive short shafts, and serve as bearings for these shafts. Each shaft carries a grooved pulley E, and over these pulleys E, F, the cords *s s* pass, which cords communicate with pulleys N, N, on the outer ends of the shafts of the paddle wheels K, K. The clamps C C, are thus made to serve a double purpose of securing one end of each rubber spring *a* down to the edge of the boat as before described, and of bearing blocks, for the crank shafts and pulleys which are used to turn the paddle wheels K K.

F is a bent hook projecting from the bow of the boat A, which hook receives a nut on its lower end.

G is a spring made of one piece of india-rubber (vulcanized) and bent over the square axle H, of the front wheels in a V-form. It is then clamped tightly to the axle by plates *g, g*, and bolts that pass through the plates so that the ends of the rubber will project out from behind the axle H. The perpendicular portion of the hook F, passes down through the rubber spring G, and this hook is prevented from springing out, by a nut that is screwed on the end of its perpendicular portion. This peculiar spring will allow the front axle H, to move in any direction and it will combine in a suitable manner elasticity with strength, at the same time this spring will prevent injury to the bow of the boat in consequence of jarring and concussions in passing over rough roads.

The exterior shape of my boat is similar to that of any ordinary row boat with the exception of the stern which is carried out so as to form a false stern with a central dividing board J, extending up from the keel to the deck J′, dividing the false stern into two apartments in each of which apartments is placed a paddle wheel K, the shafts of which wheels have their bearings in the division board J, and in the sides of the boat. The paddle wheels K, K, have ordinary radial floats like the common side paddle wheels of steam boats. Each wheel K, when the boat is dismounted and placed in the water is turned by cranks and pulleys, as shown in Fig. 1, and the boat is steered by turning first one wheel and then the other.

The apartments in the false stern are covered over as before described with a board J', so that there will be no splashing of water into the boat however hard the wind may blow, which is not the case with the side propellers unless they are covered with paddle boxes, which would not be convenient or practicable for a buggy boat.

Having thus described my invention what I claim as new, and desire to secure by Letters Patent, is:—

1. The combination of the clamps C, D, and rubber springs $a$ formed as shown, with the axle B and boat A in the manner and for the purposes herein set forth and described.

2. The combination of the peculiarly formed rubber spring clip G and plates $g, g,$ with the axle H, hook F and bow of the boat, in the manner and for the purposes herein shown and described.

3. The arrangement of the wheels E with the clamps C as and for the purposes herein shown and described.

PERRY DAVIS.

Witnesses:
 JNO. H. SCOTT,
 L. W. BENDRÉ.